Feb. 22, 1949.　　　　M. P. WINTHER　　　　2,462,451
DYNAMOELECTRIC MACHINE
Filed Aug. 12, 1946　　　　　　　　　　　　　2 Sheets-Sheet 1
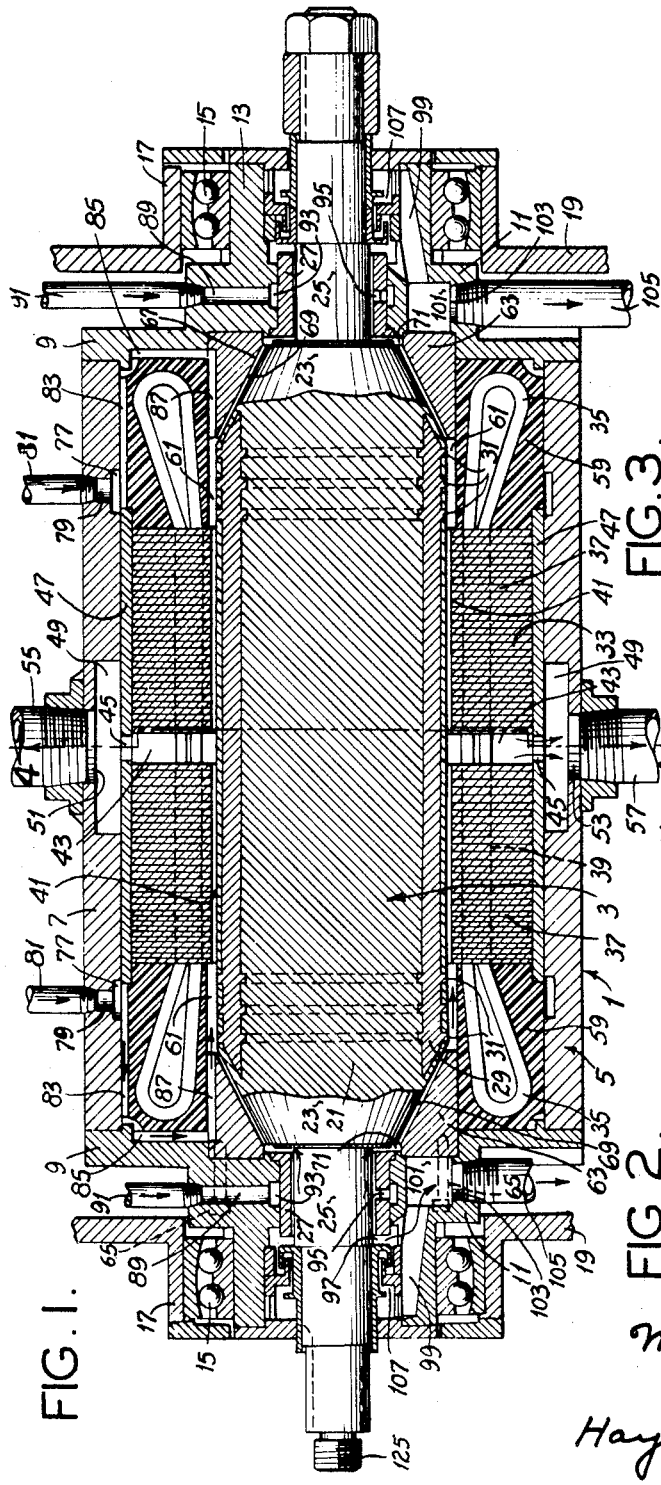

Feb. 22, 1949.  M. P. WINTHER  2,462,451
DYNAMOELECTRIC MACHINE
Filed Aug. 12, 1946  2 Sheets-Sheet 2
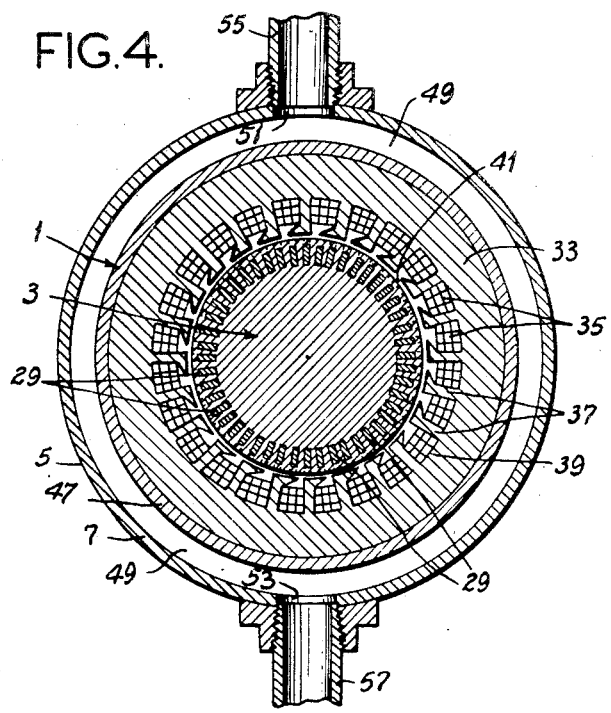
Martin P. Winther,
Inventor.
Haynes and Koenig
Attorneys.

Patented Feb. 22, 1949

2,462,451

UNITED STATES PATENT OFFICE 2,462,451

DYNAMOELECTRIC MACHINE

Martin P. Winther, Waukegan, Ill., assignor to Martin P. Winther, as trustee

Application August 12, 1946, Serial No. 689,878

6 Claims. (Cl. 172—120)

This invention relates to dynamoelectric machines, and, more particularly, to induction motors adapted for use as driving dynamometers.

Among the several objects of the invention may be noted the provision of a high-speed, high-frequency, liquid-cooled induction motor; the provision of a solid-rotor induction motor cooled by passing liquid through the gap between the rotor and stator; the provision of such a motor wherein the cooling liquid is also employed as the lubricant for the motor bearings; and the provision of a motor of this class wherein leakage of the necessary liquid is substantially minimized. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a longitudinal section through the induction motor of this invention;

Fig. 2 is a diagrammatic view in elevation of the motor of this invention mounted as a dynamometer, and shows the oil circulating associated system;

Fig. 3 is an end view of the apparatus of Fig. 2; and,

Fig. 4 is a transverse section through the motor taken on line 4—4 of Fig. 1.

Similar reference characters indicate corresponding parts throughout the several views of the drawings.

Referring now particularly to Figs. 1 and 4, the dynamoelectric machine (induction motor) of this invention comprises a stator and a rotor, generally designated 1 and 3, respectively. The stator is formed as a housing 5 including a hollow cylindrical case 7 having end heads 9 secured thereto. Each end head is formed with a hollow extension 11 provided with oil passages in a manner to be described. A hollow trunnion 13 extends outward from each extension 11. The trunnions 13 are journalled in bearings 15 mounted in bearing housings 17 formed at the upper ends of dynamometer pedestals 19. Thus, the stator 1 is supported for rocking movement in the pedestals 19. Secured to the stator case 7 is a torque arm 20 for transmitting force to the usual reversible force-measuring scales used but not shown. The reversible reactive forces supplied by the scales are indicated by the arrows in Fig. 3.

The rotor 3 comprises a solid induction drum 21 having conical ends 23. Trunnions 25, preferably formed integral with drum 21, extend outward from its ends and through the hollow extensions 11 and trunnions 13 of the stator. Trunnions 25 are journalled within bearing sleeves 27 fixed within the end head extensions 11. Thus, the rotor 3 may rotate within the stator. The rotor 3 is preferably provided with conducting bars 29 and rings 31 in the manner disclosed in my copending application for Rotors, Serial No. 591,544, filed May 2, 1945, matured as Patent No. 2,421,860.

The stator 1 includes a laminated core 33 having the usual slots therein in which field coils 35 are disposed. The slots divide the inner part of the core into a plurality of teeth 37. The spaces 39 between the teeth form channels for axial flow of oil, as will be made clear. The ends of the teeth are spaced from the surface of the induction drum 21 with as small an air gap 41 as is consistent with maintaining proper mechanical clearance. The spaces 39 and the air gap 41 may be referred to collectively as a gap between the stator and the rotor wherein there is axial flow of oil.

As illustrated in Fig. 1, the laminated core 33 is formed of two axially spaced core members 37 separated at the longitudinal center of the motor to provide a space 43. This space provides a radial passage through the stator from the gap between the stator and rotor and through ports 45 in a sleeve 47 to an annular groove 49 formed internally in stator case 7. This groove is in communication through outlet ports 51 and 53 in the stator case with exhaust pipes 55 and 57.

The ends of the field coils 35 extending from the stator core 33 are embedded in rings 59, formed of Bakelite or like material to protect the coil ends from damage due to oil or vibration. The internal diameter of these rings is substantially greater than that of induction drum 21 so as to provide annular chambers 61 communicating with the gap between the stator and rotor.

The stator field, comprising the core, field coils and rings 59, is positioned concentrically with the rotor in case 7 by end blocks 63 secured to the end heads 9 by screws 65. Each of these blocks has an internal conical surface 67 surrounding and spaced from the respective conical end 23 of the rotor to provide a passage 69 communicating with the respective chamber 61. Each block is also apertured, as indicated at 71, so that passage 69 is in communication with the adjacent rotor bearing 27.

Annular grooves 77 are formed internally in stator case 7 adjacent its ends. These grooves are in communication through inlet ports 79 with oil supply pipes 81. These grooves are also in communication with axial grooves or passages 83 in the outer periphery of rings 59. Passages 83 are in communication with radial grooves or passages 85 in the ends of rings 59. These radial grooves open into axial grooves or passages 87 in the outer periphery of blocks 63 leading to chambers 61.

Each end head extension 11 has a radial inlet port 89 therein into which is connected an oil supply pipe 91. Port 89 leads to an annular groove 93 surrounding bearing sleve 27. A port 95 in the bearing sleeve admits oil to the bearing for lubrication. Some of this oil flows axially inward from the bearing through aperture 71 and passage 69 to chamber 61. The remainder flows axially outward from the bearing through a port 97 and a passage 99 in the trunnion 13 to a chamber 101 in the end head extension 11. The chambers 101 are in communication through outlet ports 103 with exhaust pipes 105. A labyrinth seal 107 in each hollow trunnion 13 seals around the rotor trunnion 25 therein to prevent outward leakage of oil. The ports 97 are intermediate the bearings and their respective packing means.

Referring now more particularly to Fig. 2, there is shown at 109 a pump for pumping oil from a sump 111 through a flexible conduit 113 to a supply header 114 to which oil supply pipes 81 and 91 are connected. At 115 there is shown a vacuum scavenger pump, the outlet of which is connected to discharge into the sump. Exhaust pipes 55, 57 and both pipes 105 are connected to an exhaust header 117 which in turn is connected by a flexible conduit 119 to the inlet of scavenger pump 115. The conduits 113 and 119 are flexible to permit rocking movement of stator 1.

Oil discharged by pump 109 is supplied through the supply header 114 to supply pipes 81 and 91. Oil entering grooves 77 in the stator case through pipes 81 flows through passages 83, 85 and 87 to chambers 61. Oil from the left-hand chamber 61 flows axially to the right through the gap 41 between the stator and rotor. Oil from the right-hand chamber 61 flows axially to the left in the gap 41. Most of this oil flows through the channels 39 between the teeth of the stator core, though some of it flows through the air gap 41. The two streams of oil, flowing in opposite directions, cool the stator surfaces immediately surrounding the rotor and merge at the center of the motor. The oil thence flows radially outward through passage 43 to groove 49, from which it is withdrawn by scavenger pump 115 and discharged into the sump to cool.

Oil entering inlet ports 89 through pipes 91 flows to grooves 93 and through ports 95 into the bearings 27 for lubrication. Some of this oil flows axially inward from the bearings through apertures 71 in the end blocks and passages 69 to merge with the cooling oil in chambers 61. The remainder flows axially outward and through ports 97 and passages 99 to chambers 101 and exhaust pipe 105, from which it is withdrawn by scavenger pump 115.

A coupling means 125 is formed on the end of one of the rotor trunnions 25 for connecting the rotor to a device to be driven and tested. When the stator field is energized the rotor 3 drives the test device, and the driving torque transmitted reacts on the stator 1 and is measured by the force of the scale which resists arm 20. In an actual embodiment of this invention, the motor supplies 300 H. P. at 30,000 R. P. M. The air gap 41 is of the order of $1/64$ of an inch. It will be understood that the stator may be mounted so as to be stationary for use of the motor in applications other than as a driving dynamometer.

One of the advantages of the motor of this invention is that the inside portions of the stator, wherein heat generation is highest, are in direct heat-exchange relationship with the streams of cooling oil. This provides for much more efficient cooling than if the flow of cooling oil were around the outside of the stator. Since the rotor is of relatively small diameter relative to its length, and its surface is smooth, any hydraulic component of dynamometer action is small. This is desirable since such hydraulic components if large tend toward unsteady action. The small diameter relative to length also reduces the centrifugal forces. Hence the bulk of the machine is reduced for a given strength and safety.

Another advantage is in the use of an oil circulating system serving both the cooling system and the motor bearing lubrication system. The use of the vacuum scavenger pump 115 as illustrated is desirable, since such a pump induces a flow of air through the labyrinth seals 107. This inflow of air prevents oil from leaking out around the rotor trunnions through the seals.

From the above it will be seen that the liquid employed should have proper cooling and lubricating qualities and may therefore be referred to as a lubricating coolant. For example, a light lubricating oil will serve the purpose. It will be understood in this connection that the electric windings 35 are suitably protected against decomposition by the lubricating coolant by proper coverings especially where exposed in the slots between poles 37. For example, they may be wound wtih protective metal or other tape, as is known. At their end looped portions they are of course additionally protected by the material 59.

Attention is called to the fact that the overflow of oil from the bearings 27, which does not enter the passages 101, is forcibly pumped into the spaces 61 by the centrifugal action of the tapered ends 23 of the rotor.

Another advantageous feature is that of the long, smooth and solid form of the rotor, the same being substantially longer than its diameter. This admits of high speeds since the factor of centrifugal forces is minimized while preserving a strong structure. Also, the small radius minimizes the tangential speed at the liquid surface, as above suggested.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A dynamoelectric machine comprising a rotor, a stator enclosing and surrounding said rotor with a gap therebetween, bearings in the ends of said stator in which said rotor is journalled, said stator having liquid supply and exhaust passages in communication with said gap at spaced points axially of the rotor, said stator also having liquid supply inlet and exhaust passages in communication with said bearings, passages for flow of liquid axially inward from said bearings to said gap, and a liquid circulating system connected between said exhaust and supply passages.

2. A dynamoelectric machine comprising a stator including a cylindrical case and end heads, hollow extensions from said end heads, bearings in said extensions, a rotor in said case having trunnions journalled in said bearings, a stator core in said case surrounding said rotor with a gap therebetween, said stator having liquid supply passages therein in communication with ends of said gap, said stator core having a central radial passage therethrough from said gap to an exhaust port, said extensions having ports for supplying liquid to said bearings, means providing liquid passages from said bearings to the ends of said gap, and means for circulating liquid through said gap and bearings including a pump having connections to said supply passages and said bearing ports.

3. A dynamoelectric machine comprising a stator, a rotor in the stator which is substantially longer than its diameter and having a smooth cylindric periphery, peripheral rows of poles in the stator which are axially spaced from one another and from the ends of the stator and providing radial gaps with respect to the rotor, means for supplying a lubricating coolant into the stator at points between said rows of poles and the end members, means for removing said coolant at points in the stator between said rows of poles, the flow of coolant between said supply means and said removing means being through said gaps, bearing means between the rotor and the stator at the ends of the latter, and means for introducing coolant into each bearing means and directing it at least in part to join the flow of coolant within the stator and around the rotor and at least in part away from the rotor and out of the stator without joining said flow.

4. A dynamoelectric machine comprising a stator, field poles within the stator, a relatively smooth cylindric rotor within the stator and separated from said poles by a gap, endwise bearings between the stator and the rotor, means for introducing a lubricating coolant into the stator through said bearings, and means for abstracting said coolant from the stator between said bearings, said rotor being tapered at its ends adjacent said bearings and said stator having a spaced hollow inner taper adjacent each rotor taper, whereby the coolant flowing from said bearings is centrifugally forced through hollow tapered spaces between the ends of the rotor and the stator.

5. A dynamoelectric machine comprising a stator having endwise bearings, a rotor having endwise trunnions in said bearings, said stator and rotor forming a magnetic gap therebetween, spaced conical surfaces on the stator and the rotor adjacent said bearings forming a centrifugal liquid-pumping gap between the stator and the rotor, a liquid circulating system, said stator having liquid inlet and outlet passages connected with said circulating system for circulation of liquid through the magnetic gap, said bearings having liquid inlets and outlets also connected with said circulating system and also having outlets connected with the space between the conical surfaces, whereby at least some of the liquid is centrifugally pumped by the rotor from the bearings to join the liquid circulating through the magnetic gap.

6. A dynamoelectric machine comprising a stator having endwise bearings, a rotor having endwise trunnions in said bearings, said stator and rotor forming a magnetic gap therebetween, spaced conical surfaces on the stator and the rotor adjacent said bearings forming a centrifugal liquid pumping gap between the stator and the rotor, a liquid circulating system, said stator having liquid inlet and outlet passages connected with said circulating system for circulation of liquid through the magnetic gap, said bearings having liquid inlets receiving liquid from said circulating system and having outlets connected with said spaced conical surfaces, whereby liquid is centrifugally pumped by the rotor from the bearings to join the liquid circulating through the magnetic gap and ultimately returning it to the circulating system.

MARTIN P. WINTHER.

REFERENCES CITED

The following references are of record in the file of this patent:

UNITED STATES PATENTS

| Number | Name | Date |
| --- | --- | --- |
| 2,059,872 | Hull | Nov. 3, 1936 |
| 2,398,638 | Hertel | Apr. 16, 1946 |
| 2,417,686 | Hugin | Mar. 18, 1947 |
| 2,428,634 | Nordstrum | Oct. 7, 1947 |